(12) United States Patent
Kiefer et al.

(10) Patent No.: US 7,883,818 B2
(45) Date of Patent: Feb. 8, 2011

(54) PROCESS FOR PRODUCING PROTON-CONDUCTING POLYMER MEMBRANES, IMPROVED POLYMER MEMBRANES AND THE USE THEREOF IN FUEL CELLS

(75) Inventors: Joachim Kiefer, Losheim am See (DE); Oemer Uensal, Mainz (DE); Gordon Calundann, North Plainfield, NJ (US); Ursula Leister, Hattersheim (DE); Kilian Brehl, Weilmünster (DE); Edmund Thiemer, Flacht (DE); Melanie Schlegel, Stockstadt (DE)

(73) Assignee: BASF Fuel Cell GmbH, Frankfurt (DE)

( * ) Notice: Subject to any disclaimer, the term of this patent is extended or adjusted under 35 U.S.C. 154(b) by 1480 days.

(21) Appl. No.: 10/524,194

(22) PCT Filed: Aug. 14, 2003

(86) PCT No.: PCT/EP03/09018

§ 371 (c)(1), (2), (4) Date: Aug. 22, 2005

(87) PCT Pub. No.: WO2004/024796

PCT Pub. Date: Mar. 25, 2004

(65) Prior Publication Data

US 2006/0127705 A1 Jun. 15, 2006

(30) Foreign Application Priority Data

Aug. 29, 2002 (DE) ............... 102 39 701
Jul. 5, 2003 (DE) ............... 103 30 461

(51) Int. Cl.
*H01M 8/00* (2006.01)

(52) U.S. Cl. .................... 429/483; 429/129

(58) Field of Classification Search ........... 429/483, 429/129, 494, 535, 12
See application file for complete search history.

(56) References Cited

U.S. PATENT DOCUMENTS

| 5,098,985 A | 3/1992 | Harris et al. |
| 2008/0057358 A1 * | 3/2008 | Calundann et al. ........... 429/12 |

FOREIGN PATENT DOCUMENTS

| DE | 19509748 A1 | 10/1996 |
| DE | 19509749 A1 | 10/1996 |
| DE | 19757492 A1 | 7/1999 |
| DE | 10117686 A1 | 10/2002 |
| DE | 10117687 A1 | 10/2002 |
| WO | WO 92/15121 A1 | 9/1992 |
| WO | WO 00/26982 A2 | 5/2000 |
| WO | WO 01/18894 A2 | 3/2001 |
| WO | WO 03/007411 A2 | 1/2003 |
| WO | WO 03/022412 A2 | 3/2003 |

* cited by examiner

*Primary Examiner*—Jennifer Michener
*Assistant Examiner*—Monique Wills
(74) *Attorney, Agent, or Firm*—Hammer & Associates, P.C.

(57) ABSTRACT

The present invention relates to a proton-conducting polymer membrane comprising polyazoles which is obtainable by a process comprising the steps
A) preparation of a mixture comprising polyphosphoric acid, at least one polyazole and/or one or more compounds suitable for forming polyazoles under the action of heat in step B),
B) heating of the mixture obtainable according to step A) to temperatures up to 400° C. under inert gas,
C) application of a layer to a support using the mixture from step A) and/or B),
D) treatment of the membrane formed in step C) until it is self-supporting, wherein the treatment of the membrane is carried out using a hydrolysis liquid comprising oxo acids of phosphorus and/or oxo acids of sulfur.

20 Claims, No Drawings

PROCESS FOR PRODUCING PROTON-CONDUCTING POLYMER MEMBRANES, IMPROVED POLYMER MEMBRANES AND THE USE THEREOF IN FUEL CELLS

U.S. application Ser. No. 10/524,194 is a 371 of PCT/EP03/09018, filed Aug. 14, 2003

The present invention relates to a process for producing proton-conducting polymer membranes and also improved polymer membranes which, owing to their excellent chemical and thermal properties, can be used in a variety of applications and are particularly useful as polymer electrolyte membrane (PEM) in PEM fuel cells.

Proton-conducting polymer membranes having good properties are known. Thus, for example, the documents DE 10117686.4 and DE 10117687.2 describe membranes which have a high phosphoric acid content. These membranes are obtained by solidifying a soft layer comprising polyphosphoric acid to form a membrane comprising phosphoric acid. The solidification is achieved by hydrolysis of polyphosphoric acid to phosphoric acid.

In general, the hydrolysis can be achieved by means of atmospheric moisture. However, this has the disadvantage that the moisture content can fluctuate. As a result, the hydrolysis proceeds nonuniformly, so that a constant product quality cannot be achieved. At a very low atmospheric humidity, phase separation can occur.

The hydrolysis can, according to the above documents, also be carried out under temperature- and humidity-controlled conditions. However, the problem is that the hydrolysis proceeds very slowly and it takes a long time to achieve a high acid content. It has to be considered that a temperature- and humidity-controlled chamber is quite expensive.

Furthermore, the hydrolysis commences on one side from a surface, with the hydrolysis commencing at a point. It is, however, advisable to hydrolyze the membrane until a homogeneous membrane is formed, since otherwise the membrane is relatively unstable, so that it can be damaged on detachment from an inert support.

In addition, it has been found that although a short hydrolysis leads to a membrane having a high phosphoric acid content, this membrane has quite a low mechanical stability. If the hydrolysis is carried out for a longer period, the mechanical stability does increase but the phosphoric acid content decreases.

It is therefore an object of the present invention to provide a process for producing polymer electrolyte membranes which achieve the objects indicated above. In particular, the process should make inexpensive production of polymer electrolyte membranes having a high, constant product quality possible. Furthermore, it was an object of the present invention to produce polymer electrolyte membranes which have a high mechanical stability in relation to their performance. Furthermore, the membranes should display a high level of performance, in particular a high conductivity over a wide temperature range.

These objects are achieved by a process for producing proton-conducting polymer membranes having all the features of claim 1. With regard to the polymer membranes, claim 18 achieves the object of the invention.

The present invention accordingly provides a proton-conducting polymer membrane comprising polyazole blends and obtainable by a process comprising the steps A) preparation of a mixture comprising polyphosphoric acid, at least one polyazole and/or one or more compounds suitable for forming polyazoles under the action of heat in step B), B) heating of the mixture obtainable according to step A) to temperatures up to 400° C. under inert gas, C) application of a layer to a support using the mixture from step A) and/or B), D) treatment of the membrane formed in step C), characterized in that the treatment of the membrane is carried out using a hydrolysis liquid comprising oxo acids of phosphorus and/or oxo acids of sulfur.

According to the present invention, the membrane can be introduced into a hydrolysis liquid comprising, for example, a prescribed concentration of phosphoric acid immediately after application by means of a doctor blade. This makes automated production of high-performance membranes possible. Variation of the acid concentration enables the hydrolysis rate and membrane properties ($H_3PO_4$ content, conductivity) to be set in a targeted manner. Phase separation as can occur during hydrolysis in an environment having a low atmospheric humidity can be essentially ruled out.

The hydrolysis time for the membrane can also be shortened significantly by increasing the temperature. These advantages make it possible to produce the membranes in a more controlled fashion, so that a particularly constant high quality is achieved.

The process of the invention makes it possible to obtain, in particular, membranes which have a high mechanical stability at a very high acid concentration.

In addition, the membranes obtained by the present process can be stored particularly simply for a relatively long time by welding into an acid-stable film, for example a polyethylene or polypropylene film.

A membrane according to the invention displays a high conductivity over a large temperature range, and this is achieved even without additional moistening. Here, a membrane according to the invention has a relatively high mechanical stability.

Furthermore, these membranes have a surprisingly long life.

The composition prepared in step B) comprises polyazoles. These polymers can be added in step A). Alternatively, these polymers can also be obtained from the monomers on which the polymer is based, oligomers and/or prepolymers during heating in step B).

Polymers based on polyazole comprise recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

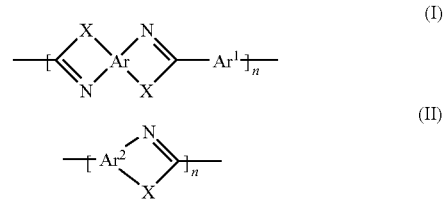

-continued
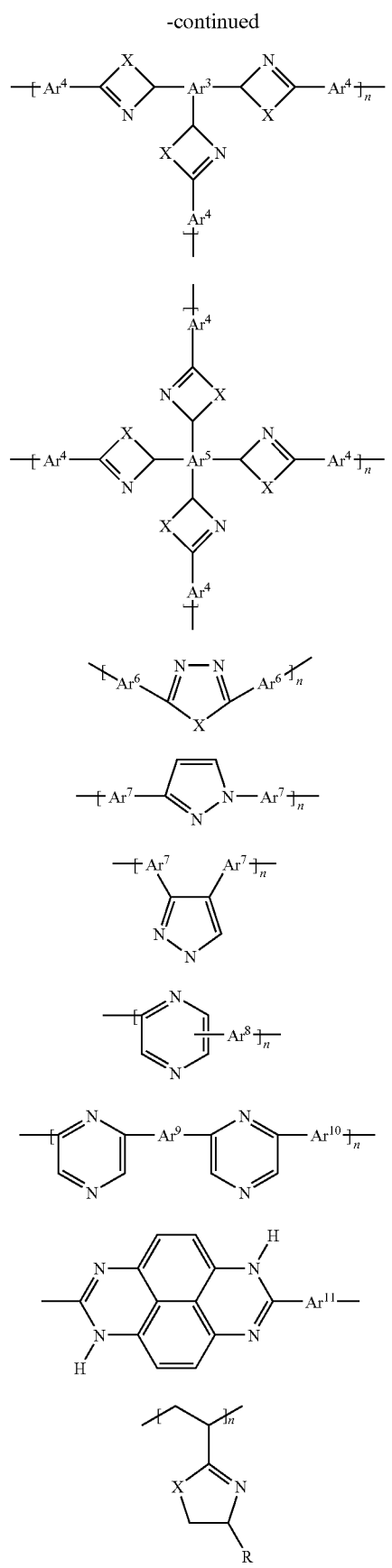
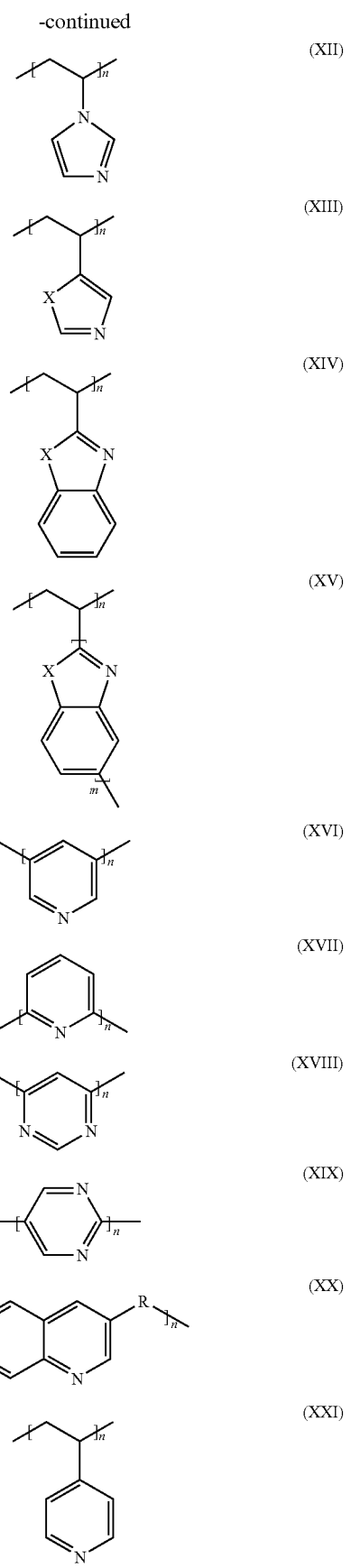

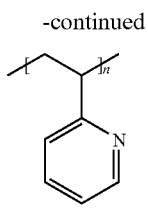

(XXII)

where the radicals Ar are identical or different and are each a tetravalent aromatic or heteroaromatic group which can be monocyclic or polycyclic, the radicals $Ar^1$ are identical or different and are each a divalent aromatic or heteroaromatic group which can be monocyclic or polycyclic, the radicals $Ar^2$ are identical or different and are each a divalent or trivalent aromatic or heteroaromatic group which can be monocyclic or polycyclic, the radicals $Ar^3$ are identical or different and are each a trivalent aromatic or heteroaromatic group which can be monocyclic or polycyclic, the radicals $Ar^4$ are identical or different and are each a trivalent aromatic or heteroaromatic group which can be monocyclic or polycyclic, the radicals $Ar^5$ are identical or different and are each a tetravalent aromatic or heteroaromatic group which can be monocyclic or polycyclic, the radicals $Ar^6$ are identical or different and are each a divalent aromatic or heteroaromatic group which can be monocyclic or polycyclic, the radicals $Ar^7$ are identical or different and are each a divalent aromatic or heteroaromatic group which can be monocyclic or polycyclic, the radicals $Ar^8$ are identical or different and are each a trivalent aromatic or heteroaromatic group which can be monocyclic or polycyclic, the radicals $Ar^9$ are identical or different and are each a divalent or trivalent or tetravalent aromatic or heteroaromatic group which can be monocyclic or polycyclic, the radicals $Ar^{10}$ are identical or different and are each a divalent or trivalent aromatic or heteroaromatic group which can be monocyclic or polycyclic, the radicals $Ar^{11}$ are identical or different and are each a divalent aromatic or heteroaromatic group which can be monocyclic or polycyclic, the radicals X are identical or different and are each oxygen, sulfur or an amino group which bears a hydrogen atom, a group having 1-20 carbon atoms, preferably a branched or unbranched alkyl or alkoxy group, or an aryl group as further radical, the radicals R are identical or different and are each hydrogen, an alkyl group or an aromatic group, with the proviso that R in the formula XX is a divalent group, and n, m are each an integer greater than or equal to 10, preferably greater than or equal to 100.

Aromatic or heteroaromatic groups which are preferred according to the invention are derived from benzene, naphthalene, biphenyl, diphenyl ether, diphenylmethane, diphenyldimethylmethane, bisphenone, diphenyl sulfone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may also be substituted.

$Ar^1$, $Ar^4$, $Ar^6$, $Ar^7$, $Ar^8$, $Ar^9$, $Ar^{10}$, $Ar^{11}$ can have any substitution pattern; in the case of phenylene, $Ar^1$, $Ar^4$, $Ar^6$, $Ar^7$, $Ar^8$, $Ar^9$, $Ar^{10}$, $Ar^{11}$ can be, for example, ortho-, meta- or para-phenylene. Particularly preferred groups are derived from benzene and biphenylene, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl and naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles having recurring units of the formula (I) in which the radicals X within one recurring unit are identical.

The polyazoles can in principle also have different recurring units which differ, for example, in their radical X. However, preference is given to only identical radicals X being present in a recurring unit.

Further preferred polyazole polymers are polyimidazoles, polybenzimidazole ether ketone polybenzothiazoles, polybenzoxazoles, polyoxadiazoles, polyquinoxalines, polythiadiazoles, poly(pyridines), poly(pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole containing only units of the formula (I) and/or (II).

The number of recurring azole units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units are represented by the following formulae:

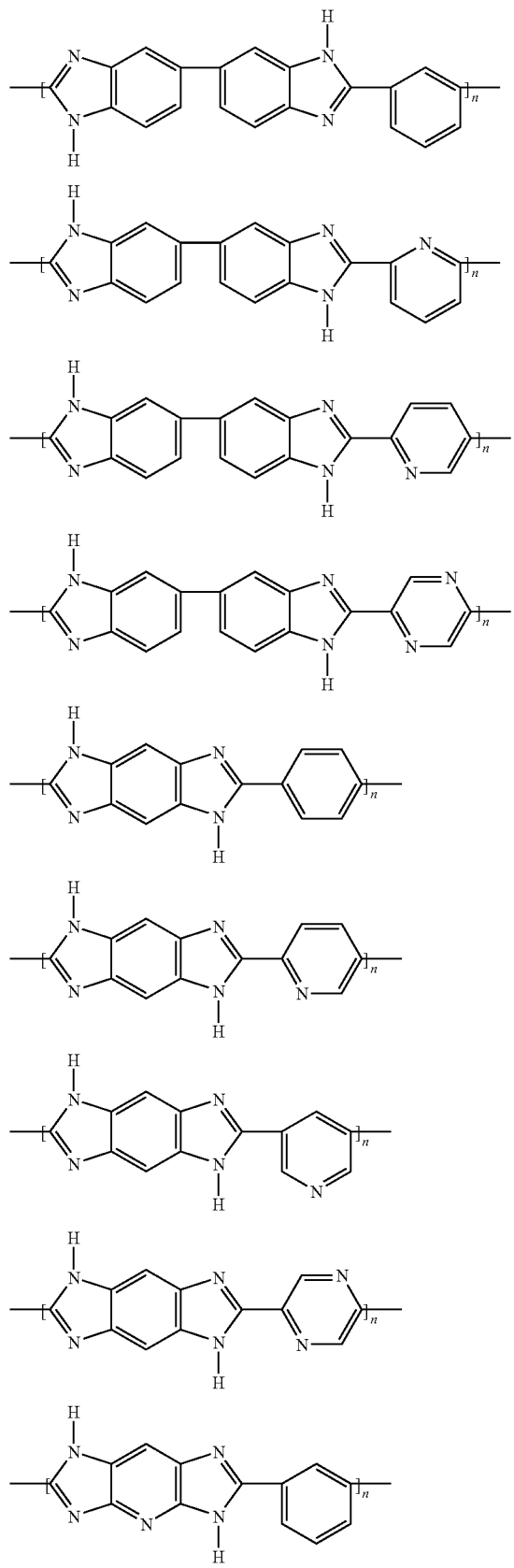
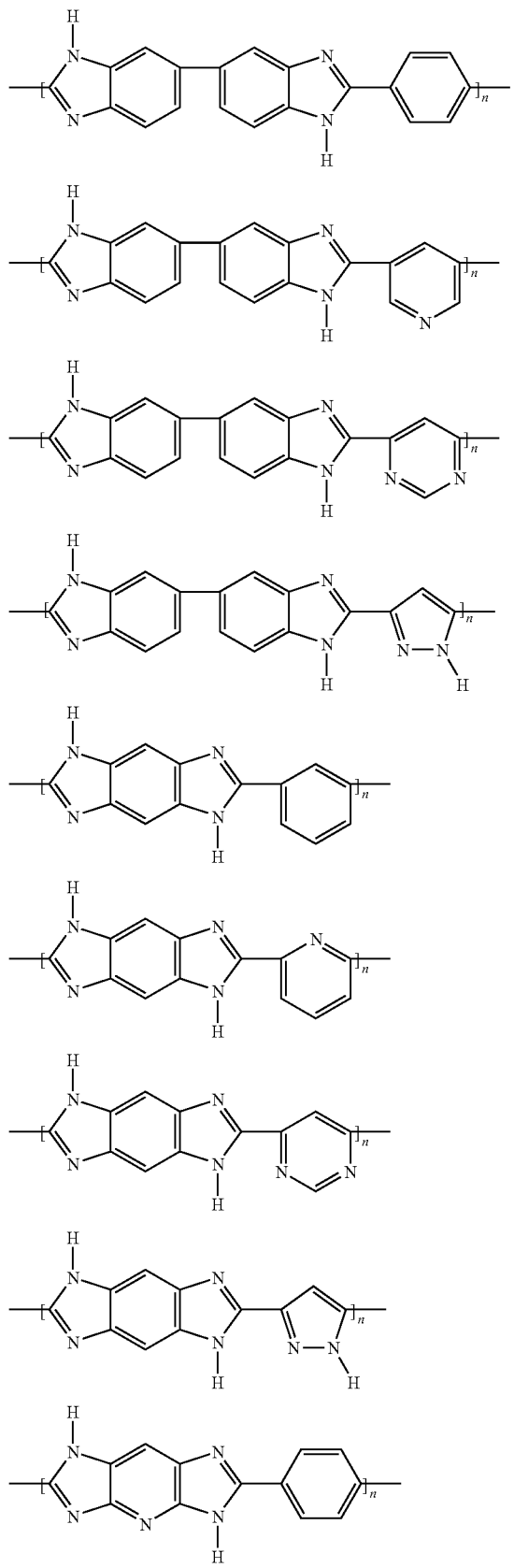

-continued

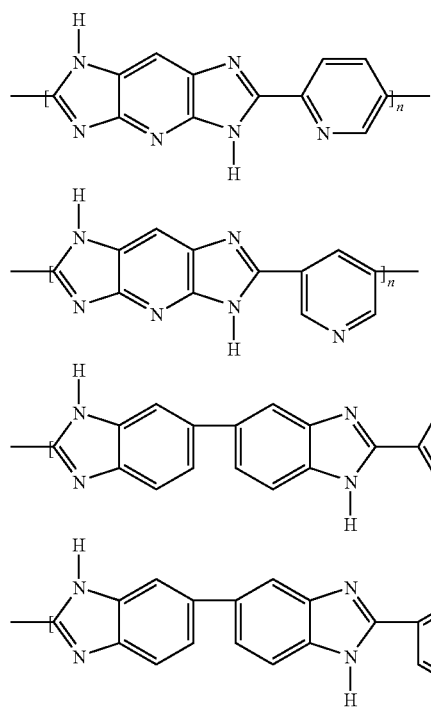
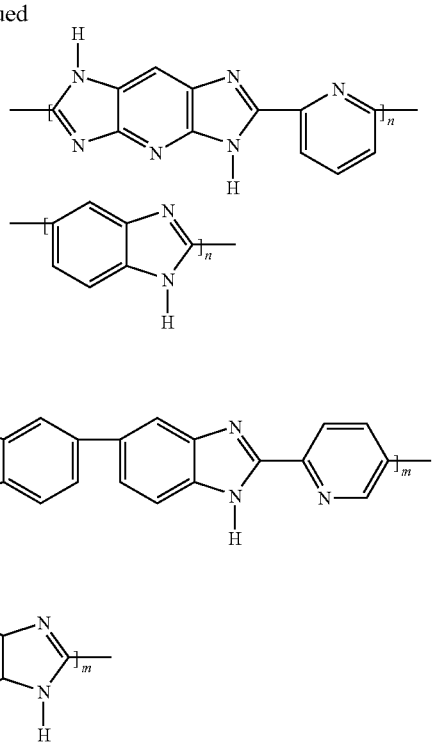

where n and m are each an integer greater than or equal to 10, preferably greater than or equal to 100.

The polyazoles used in step A), but in particular the polybenzimidazoles, have a high molecular weight. Measured as intrinsic viscosity, it is preferably in the range from 0.3 to 10 dl/g, in particular from 1 to 5 dl/g.

Furthermore, the polyazoles can also be prepared by heating in step B). For this purpose, one or more compounds which are suitable for forming polyazoles under the action of heat in step B) can be added to the mixture from step A).

Mixtures comprising one or more aromatic and/or heteroaromatic tetramino compounds and one or more aromatic and/or heteroaromatic carboxylic acids or derivatives thereof which contain at least two acid groups per carboxylic acid monomer are suitable for this purpose. Furthermore, it is possible to use one or more aromatic and/or heteroaromatic diamino carboxylic acids for preparing polyazoles.

The aromatic and heteroaromatic tetramino compounds include, inter alia, 3,3',4,4'-tetraminobiphenyl, 2,3,5,6-tetraminopyridine, 1,2,4,5-tetraminobenzene, bis(3,4-diaminophenyl) sulfone, bis(3,4-diaminophenyl) ether, 3,3',4,4'-tetraminobenzophenone, 3,3',4,4'-tetraminodiphenylmethane and 3,3',4,4'-tetraminodiphenyldimethylmethane and their salts, in particular their monohydrochloride, dihydrochloride, trihydrochloride and tetrahydrochloride derivatives. Among these, particular preference is given to 3,3',4,4'-tetraminobiphenyl, 2,3,5,6-tetraminopyridine and 1,2,4,5-tetraminobenzene.

Furthermore, the mixture A) can comprise aromatic and/or heteroaromatic carboxylic acids. These are dicarboxylic acids and tricarboxylic acids and tetracarboxylic acids or esters thereof, anhydrides thereof or acid halides thereof, in particular acid halides and/or acid bromides thereof. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or C1-C20-alkyl esters or C5-C12-aryl esters thereof, or anhydrides thereof or acid chlorides thereof.

The aromatic tricarboxylic acids or C1-C20-alkyl esters or C5-C12-aryl esters thereof or anhydrides thereof or acid chlorides thereof are preferably 1,3,5-benzenetricarboxylic acid (trimesic acid), benzenetricarboxylic acid (trimellitic acid), (2-carboxyphenyl)iminodiacetic acid, 3,5,3'-biphenyltricarboxylic acid. 3,5,4'-biphenyltricarboxylic acid, the aromatic tetracarboxylic acids or C1-C20-alkyl esters or C5-C12-aryl esters thereof or anhydrides thereof or acid chlorides thereof are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids are heteroaromatic dicarboxylic acids and tricarboxylic acids and tetracarboxylic acids or esters thereof or anhydrides thereof. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also C1-C20-alkyl esters or C5-C12-aryl esters thereof, or anhydrides thereof or acid chlorides thereof.

The content of tricarboxylic acids or tetracarboxylic acids (based on dicarboxylic acid used) is in the range from 0 to 30 mol %, preferably from 0.1 to 20 mol %, in particular from 0.5 to 10 mol %.

Furthermore, the mixture A) can further comprise aromatic and heteroaromatic diamino carboxylic acids. These include, inter alia, diaminobenzoic acid, 4-phenoxycarbonyl-3-aminophenyl 4-aminophenyl ether and their monohydrochloride and dihydrochloride derivatives.

Mixtures of at least 2 different aromatic carboxylic acids are preferably used in step A). Particular preference is given to using mixtures comprising not only aromatic carboxylic acids but also heteroaromatic carboxylic acids. The mixing ratio of aromatic carboxylic acids to heteroaromatic carboxylic acids is from 1:99 to 99:1, preferably from 1:50 to 50:1.

These mixtures are, in particular, mixtures of N-heteroaromatic dicarboxylic acids and aromatic dicarboxylic acids. Nonlimiting examples of dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

If a very high molecular weight is to be achieved, the molar ratio of carboxylic acid groups to amino groups in the reaction of tetramino compounds with one or more aromatic carboxylic acids or esters thereof which contain at least two acid groups per carboxylic acid monomer is preferably in the vicinity of 1:2.

The mixture prepared in step A) preferably comprises at least 0.5% by weight, in particular from 1 to 30% by weight and particularly preferably from 2 to 15% by weight, of monomers for preparing polyazoles.

If tricarboxylic acids or tetracarboxylic acids are present in the mixture prepared in step A), they effect branching/crosslinking of the polymer formed. This contributes to an improvement in the mechanical properties.

According to a further aspect of the present invention, the mixture prepared in step A) comprises compounds which are suitable for forming polyazoles under the action of heat in step B), with these compounds being able to be obtained by reaction of one or more aromatic and/or heteroaromatic tetramino compounds with one or more aromatic and/or heteroaromatic carboxylic acids or derivatives thereof which contain at least two acid groups per carboxylic acid monomer or of one or more aromatic and/or heteroaromatic diamino carboxylic acids in the melt at temperatures of up to 400° C., in particular up to 350° C., preferably up to 280° C. The compounds to be used for preparing these prepolymers have been mentioned above.

The polyphosphoric acid used in step A) is commercial polyphosphoric acid as is obtainable, for example, from Riedel-de Haen. Polyphosphoric acids $H_{n+2}P_nO_{3n+1}$ (n>1) usually have an assay calculated as $P_2O_5$ (acidimetric) of at least 83%. In place of a solution of the monomers, it is also possible to produce a dispersion/suspension.

According to a particular aspect of the present invention, at least one further polymer which is not a polyazole (a polymer (B)) can be added to the composition produced in step A) and/or step B). This polymer can be, inter alia, in dissolved, dispersed or suspended form.

Here, the weight ratio of polyazole to polymer (B) can be, in particular, in the range from 0.1 to 50, preferably from 0.2 to 20, particularly preferably from 1 to 10. If the polyazole is not formed until step B), the weight ratio can be calculated from the weight of the monomers for forming the polyazole, taking into account the compounds liberated in the condensation, for example water.

Preferred polymers include, inter alia, polyolefins such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitrosomethane, with sulfonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular ones derived from norbornene;

polymers having C—O bonds in the main chain, for example polyacetal, polyoxymethylene, polyethers, polypropylene oxide, polyepichlorohydrin, polytetrahydrofuran, polyphenylene oxide, polyether ketone, polyesters, in particular polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the main chain, for example polysulfide ether, polyphenylene sulfide, polyether sulfone;

polymers having C—N bonds in the main chain, for example polyimines, polyisocyanides, polyetherimine, polyaniline, polyamides, polyhydrazides, polyurethanes, polyimides, polyazoles, polyazines;

liquid-crystalline polymers, in particular Vectra, and inorganic polymers, for example polysilanes, polycarbosilanes, polysiloxanes, polysilicic acid, polysilicates, silicones, polyphosphazines and polythiazyl.

The mixture obtained in step A) is heated to a temperature up to 400° C., in particular up to 350° C., preferably up to 280° C., in particular from 100° C. to 250° C. and particularly preferably in the range from 180° C. to 250° C., in step B). Here, an inert gas, for example nitrogen or a noble gas such as neon, argon, is used. This step serves, depending on the starting material, either to dissolve or disperse the polyazoles or to form polyazoles from monomers or polymeric precursors of the polyazoles.

In one variant of the process, the heating according to step B) can be carried out after formation of a sheet-like structure according to step C).

The mixture prepared in step A) and/or step B) can further comprise organic solvents. These can have a positive influence on the processability. Thus, for example, the rheology of the solution can be improved so that it can more easily be extruded or spread by doctor blade coating.

To achieve a further improvement in the use properties, fillers, in particular proton-conducting fillers, and additional acids can also be added to the membrane. The addition can be carried out, for example, in step A), step B) and/or step C). Furthermore, these additives can, if these are in liquid form, also be added after the polymerization in step D). Furthermore, these additives can be added to the hydrolysis liquid.

Nonlimiting examples of proton-conducting fillers are
sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$,
phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$,
polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$,
selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$,
oxides such as $Al_2O_3$, $Sb_2O_5$, $ThO_2$, $SnO_2$, $ZrO_2$, $MoO_3$,
silicates such as zeolites, zeolites ($NH_4^+$), sheet silicates, framework silicates, H-natrolites, H-mordenites, $NH_4$-analcines, $NH_4$-sodalites, $NH_4$-gallates, H-montmorillonites,
acids such as $HClO_4$, $SbF_5$,
fillers such as carbides, in particular SiC, $Si_3N_4$, fibers, in particular glass fibers, glass powders and/or polymer fibers, preferably ones based on polyazoles.

These additives can be present in customary amounts in the proton-conducting polymer membrane, but the positive properties such as high conductivity, long life and high mechanical stability of the membrane should not be impaired too much by addition of excessive amounts of additives. In general, the membrane after the treatment in step D) contains not more than 80% by weight, preferably not more than 50% by weight and particularly preferably not more than 20% by weight, of additives.

In addition, this membrane can further comprise perfluorinated sulfonic acid additives (preferably 0.1-20% by weight, more preferably 0.2-15% by weight, very particularly preferably 0.2-10% by weight). These additives lead to an increase in power, in the vicinity of the cathode to an increase in the oxygen solubility and oxygen diffusion and to a reduction in the adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902, and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

The formation of the sheet-like structure in step C) is carried out by means of methods known per se (casting, spraying, doctor blade coating, extrusion) which are known from the prior art for the production of polymer films. Suitable supports are all supports which are inert under the conditions. These supports include, in particular, films of polyethylene terephthalate (PET), polytetrafluoroethylene (PTFE), polyhexafluoropropylene, copolymers of PTFE with hexafluoropropylene, polyimides, polyphenylene sulfides (PPS) and polypropylene (PP).

To adjust the viscosity, the mixture can, if appropriate, be admixed with a volatile organic solvent. In this way, the viscosity can be set to the desired value and the formation of the membrane can be made easier.

The thickness of the sheet-like structure from step C) is preferably in the range from 10 to 4000 μm, more preferably from 15 to 3500 μm, in particular from 20 to 3000 μm, particularly preferably from 30 to 1500 μm and very particularly preferably from 50 to 1200 μm.

The treatment of the membrane in step D) is carried out, in particular, at temperatures in the range from 0° C. to 150° C., preferably at temperatures in the range from 10° C. to 120° C., in particular in the range from room temperature (20° C.) to 90° C., by means of a hydrolysis liquid comprising water and at least one oxo acid of phosphorus and/or sulfur. The treatment is preferably carried out under atmospheric pressure, but can also be carried out at superatmospheric pressure.

The hydrolysis liquid can be a solution and may also contain suspended and/or dispersed constituents. The viscosity of the hydrolysis liquid can be within a wide range, and addition of solvents or increasing the temperature can be employed for adjusting the viscosity. The dynamic viscosity is preferably in the range from 0.1 to 10 000 mPa*s, in particular from 0.2 to 2000 mPa*s, with these values being able to be measured, for example, in accordance with DIN 53015.

The treatment in step D) can be carried out using any known method. For example, the membrane obtained in step C) can be dipped in a bath of liquid. Furthermore, the hydrolysis liquid can be sprayed onto the membrane. Alternatively, the hydrolysis liquid can be poured over the membrane. The latter methods have the advantage that the concentration of acid in the hydrolysis liquid remains constant during the hydrolysis. However, the first method is frequently cheaper to carry out.

Oxo acids of phosphorus and/or sulfur include, in particular, phosphinic acid, phosphonic acid, phosphoric acid, hypodiphosphonic acid, hypodiphosphoric acid, oligophosphoric acids, sulfurous acid, disulfurous acid and/or sulfuric acid. These acids can be used individually or as a mixture.

Furthermore, oxo acids of phosphorus and/or sulfur also include monomers which contain phosphonic acid and/or sulphonic acid groups and are capable of free-radical polymerization.

Monomers containing phosphonic acid groups are known to those skilled in the art. These are compounds which have at least one carbon-carbon double bond and at least one phosphonic acid group. Preference is given to the two carbon atoms which form a carbon-carbon double bond having at least two, preferably three, bonds to groups which lead to low steric hindrance of the double bond. Such groups include, inter alia, hydrogen atoms and halogen atoms, in particular fluorine atoms. In the context of the present invention, the polymer containing phosphonic acid groups is obtained from the polymerization product obtained by polymerization of the monomer containing phosphonic acid groups either alone or with further monomers and/or crosslinkers.

The monomer containing phosphonic acid groups can have one, two, three or more carbon-carbon double bonds. Furthermore, the monomer containing phosphonic acid groups can have one, two, three or more phosphonic acid groups.

In general, the monomer containing phosphonic acid groups has from 2 to 20, preferably from 2 to 10, carbon atoms.

The monomer containing phosphonic acid groups is preferably a compound of the formula

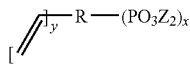

where
R is a bond, a divalent C1-C15-alkylene group, divalent C1-C15-alkylenoxy group, for example ethylenoxy group, or divalent C5-C20-aryl or heteroaryl group, with the above radicals being able to be in turn substituted by halogen, —OH, COOZ, —CN, NZ$_2$,
the radicals Z are each, independently of one another, hydrogen, C1-C15-alkyl group, a C1-C15-alkoxy group, ethylenoxy group or C5-C20-aryl or heteroaryl group, with the above radicals being able to be in turn substituted by halogen, —OH, —CN, and
x is 1, 2, 3, 4, 5, 6, 7, 8, 9 or 10,
y is 1, 2, 3, 4, 5, 6, 7, 8, 9 or 10, and/or the formula

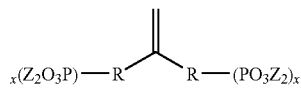

where
R is a bond, a divalent C1-C15-alkylene group, divalent C1-C15-alkylenoxy group, for example ethylenoxy group, or divalent C5-C20-aryl or heteroaryl group, with the above radicals being able to be in turn substituted by halogen, —OH, COOZ, —CN, NZ$_2$,
the radicals Z are each, independently of one another, hydrogen, a C1-C15-alkyl group, C1-C15-alkoxy group, ethylenoxy group or C5-C20-aryl or heteroaryl group, with the above radicals being able to be in turn substituted by halogen, —OH, —CN, and
x is 1, 2, 3, 4, 5, 6, 7, 8, 9 or 10, and/or the formula

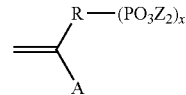

where
A is a group of the formula COOR$^2$, CN, CONR$^2{}_2$, OR$^2$ and/or R$^2$,
where R$^2$ is hydrogen, a C1-C15-alkyl group, C1-C15-alkoxy group, ethylenoxy group or C5-C20-aryl or heteroaryl group, with the above radicals being able to be in turn substituted by halogen, —OH, COOZ, —CN, NZ$_2$,
R is a bond, a divalent C1-C15-alkylene group, divalent C1-C15-alkylenoxy group, for example ethylenoxy group, or divalent C5-C20-aryl or heteroaryl group, with the above radicals being able to be in turn substituted by halogen, —OH, COOZ, —CN, NZ$_2$,
the radicals Z are each, independently of one another, hydrogen, a C1-C15-alkyl group, a C1-C15-alkoxy group, ethylenoxy group or C5-C20-aryl or heteroaryl group, with the above radicals being able to be in turn substituted by halogen, —OH, —CN, and
x is 1, 2, 3, 4, 5, 6, 7, 8, 9 or 10.

Preferred monomers containing phosphonic acid groups include, inter alia, alkenes containing phosphonic acid groups, e.g. ethenephosphonic acid, propenephosphonic acid, butenephosphonic acid; acrylic acid and/or methacrylic acid compounds containing phosphonic acid groups, for example 2-phosphonomethylacrylic acid, 2-phosphonomethylmethacrylic acid, 2-phosphonomethylacrylamide and 2-phosphonomethylmethacrylamide.

Particular preference is given to using commercial vinylphosphonic acid (ethenephosphonic acid) as is available, for example, from Aldrich or Clariant GmbH. A preferred vinylphosphonic acid has a purity of more than 70%, in particular 90% and particularly preferably more than 97%.

Furthermore, the monomers containing phosphonic acid groups can also be used in the form of derivatives which can subsequently be converted into the acid, with the conversion into the acid also being able to be carried out in the polymerized state. Derivatives of this type include, in particular, the salts, esters, amides and halides of the monomers containing phosphonic acid groups.

Furthermore, the monomers containing phosphonic acid groups can also be applied to or introduced into the membrane after the hydrolysis. This can be carried out by methods known per se from the prior art (e.g. spraying, dipping, etc.).

According to a particular aspect of the present invention, the ratio of the total weight of phosphoric acid, polyphosphoric acid and the hydrolysis products of the polyphosphoric acid to the weight of the monomers capable of free-radical polymerization, for example the monomers containing phosphonic acid groups, is preferably greater than or equal to 1:2, in particular greater than or equal to 1:1 and particularly preferably greater than or equal to 2:1.

The ratio of the total weight of phosphoric acid, polyphosphoric acid and the hydrolysis products of polyphosphoric acid to the weight of the monomers capable of free-radical polymerization is preferably in the range from 1000:1 to 3:1, in particular from 100:1 to 5:1 and particularly preferably from 50:1 to 10:1.

This ratio can easily be determined by customary methods, with the phosphoric acid, polyphosphoric acid and its hydrolysis products frequently being able to be washed out of the membrane. Here, the weight of the polyphosphoric acid and its hydrolysis products after complete hydrolysis can be expressed as a ratio to phosphoric acid. This generally likewise applies to the monomers capable of free-radical polymerization.

Monomers containing sulfonic acid groups are known to those skilled in the art. These are compounds which have at least one carbon-carbon double bond and at least one sulfonic acid group. Preference is given to the two carbon atoms which form a carbon-carbon double bond having at least two, preferably three, bonds to groups which lead to low steric hindrance of the double bond. Such groups include, inter alia, hydrogen atoms and halogen atoms, in particular fluorine atoms. In the context of the present invention, the polymer containing sulfonic acid groups is obtained from the polymerization product obtained by polymerization of the monomer containing sulfonic acid groups either alone or with further monomers and/or crosslinkers.

The monomer containing sulfonic acid groups can have one, two, three or more carbon-carbon double bonds. Furthermore, the monomer containing sulfonic acid groups can have one, two, three or more sulfonic acid groups.

In general, the monomer containing sulfonic acid groups has from 2 to 20, preferably from 2 to 10, carbon atoms.

The monomer containing sulfonic acid groups is preferably a compound of the formula

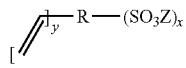

where
R is a bond, a divalent C1-C15-alkylene group, divalent C1-C15-alkylenoxy group, for example ethylenoxy group, or divalent C5-C20-aryl or heteroaryl group, with the above radicals being able to be in turn substituted by halogen, —OH, COOZ, —CN, $NZ_2$,
the radicals Z are each, independently of one another, hydrogen, a C1-C15-alkyl group, a C1-C15-alkoxy group, ethylenoxy group or C5-C20-aryl or heteroaryl group, with the above radicals being able to be in turn substituted by halogen, —OH, —CN, and
x is 1, 2, 3, 4, 5, 6, 7, 8, 9 or 10,
y is 1, 2, 3, 4, 5, 6, 7, 8, 9 or 10,
and/or the formula

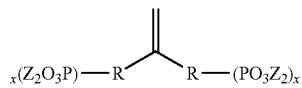

where
R is a bond, a divalent C1-C15-alkylene group, divalent C1-C15-alkylenoxy group, for example ethylenoxy group, or divalent C5-C20-aryl or heteroaryl group, with the above radicals being able to be in turn substituted by halogen, —OH, COOZ, —CN, $NZ_2$,
the radicals Z are each, independently of one another, hydrogen, a C1-C15-alkyl group, C1-C15-alkoxy group, ethylenoxy group or C5-C20-aryl or heteroaryl group, with the above radicals being able to be in turn substituted by halogen, —OH, —CN, and
x is 1, 2, 3, 4, 5, 6, 7, 8, 9 or 10, and/or the formula

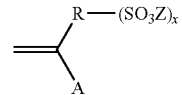

where
A is a group of the formula $COOR^2$, CN, $CONR^2_2$, $OR^2$ and/or $R^2$, where $R^2$ is hydrogen, a C1-C15-alkyl group, C1-C15-alkoxy group, ethylenoxy group or C5-C20-aryl or heteroaryl group, with the above radicals being able to be in turn substituted by halogen, —OH, COOZ, —CN, $NZ_2$,
R is a bond, a divalent C1-C15-alkylene group, divalent C1-C15-alkylenoxy group, for example ethylenoxy group, or divalent C5-C20-aryl or heteroaryl group, with the above radicals being able to be in turn substituted by halogen, —OH, COOZ, —CN, $NZ_2$,
the radicals Z are each, independently of one another, hydrogen, a C1-C15-alkyl group, C1-C15-alkoxy group, ethylenoxy group or C5-C20-aryl or heteroaryl group, with the above radicals being able to be in turn substituted by halogen, —OH, —CN, and
x is 1, 2, 3, 4, 5, 6, 7, 8, 9 or 10.

Preferred monomers containing sulfonic acid groups include, inter alia, alkenes containing sulfonic acid groups, e.g. ethenesulfonic acid, propenesulfonic acid, butenesulfonic acid; acrylic acid and/or methacrylic acid compounds containing sulfonic acid groups, for example 2-sulfonomethylacrylic acid, 2-sulfonomethylmethacrylic acid, 2-sulfonomethylacrylamide and 2-sulfonomethylmethacrylamide.

Particular preference is given to using commercial vinylsulfonic acid (ethenesulfonic acid) as is available, for example, from Aldrich or Clariant GmbH. A preferred vinylsulfonic acid has a purity of more than 70%, in particular 90% and particularly preferably more than 97%.

Furthermore, the monomers containing sulfonic acid groups can also be used in the form of derivatives which can subsequently be converted into the acid, with the conversion into the acid also being able to be carried out in the polymerized state. Derivatives of this type include, in particular, the salts, esters, amides and halides of the monomers containing sulfonic acid groups.

Furthermore, the monomers containing sulfonic acid groups can also be applied to or introduced into the membrane after the hydrolysis. This can be carried out by methods known per se from the prior art (e.g. spraying, dipping, etc.).

In a further embodiment of the invention, monomers capable of effecting crosslinking can be used. These monomers can be added to the hydrolysis liquid. Furthermore, the monomers capable of effecting crosslinking can also be applied to the membrane obtained after hydrolysis.

The monomers capable of effecting crosslinking are, in particular, compounds having at least 2 carbon-carbon double bonds. Preference is given to dienes, trienes, tetraenes, di(methylacrylates), tri(methylacrylates), tetra(methylacrylates), diacrylates, triacrylates, tetraacrylates.

Particular preference is given to dienes, trienes, tetraenes of the formula

di(methylacrylates), tri(methylacrylates), tetra(methylacrylates) of the formula

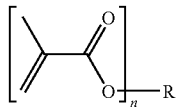

diacrylates, triacrylates, tetraacrylates of the formula

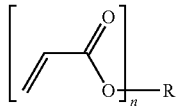

where

R is a C1-C15-alkyl group, C5-C20-aryl group or heteroaryl group, NR', —SO$_2$, PR', Si(R')$_2$, with the above radicals being able to be in turn substituted, the radicals R' are each, independently of one another, hydrogen, a C1-C15-alkyl group, C1-C15-alkoxy group, C5-C20-aryl or heteroaryl group and n is at least 2.

The substituents of the abovementioned radical R are preferably halogen, hydroxyl, carboxy, carboxyl, carboxyl ester, nitriles, amines, silyl, siloxane radicals.

Particularly preferred crosslinkers are allyl methacrylate, ethylene glycol dimethacrylate, diethylene glycol dimethacrylate, triethylene glycol dimethacrylate, tetraethylene and polyethylene glycol dimethacrylate, 1,3-butanediol dimethacrylate, glycerol dimethacrylate, diurethane dimethacrylate, trimethylolpropane trimethacrylate, epoxyacrylates, for example Ebacryl, N',N-methylenebisacrylamide, carbinol, butadiene, isoprene, chloroprene, divinylbenzene and/or bisphenol A dimethylacrylate. These compounds are commercially available, for example, from Sartomer Company Exton, Pa., under the designations CN-120, CN104 and CN-980.

The use of crosslinkers is optional, and these compounds can usually be used in amounts in the range from 0.05 to 30% by weight, preferably from 0.1 to 20% by weight, particularly preferably from 1 to 10% by weight, based on the weight of the membrane.

The crosslinking monomers can also be applied to and introduced into the membrane after the hydrolysis. This can be carried out by methods known per se from the prior art (e.g. spraying, dipping, etc.).

According to a particular aspect of the present invention, the monomers containing phosphonic acid and/or sulfonic acid groups or the crosslinking monomers can be polymerized, with the polymerization preferably occurring by a free-radical mechanism. Free-radical formation can be effected thermally, photochemically, chemically and/or electrochemically.

For example, an initiator solution containing at least one substance capable of forming free radicals can be added to the hydrolysis liquid. Furthermore, an initiator solution can be applied to the membrane after the hydrolysis. This can be carried out by methods known per se from the prior art (e.g. spraying, dipping, etc.).

Suitable free-radical formers include, inter alia, azo compounds, peroxy compounds, persulfate compounds or azoamidines. Nonlimiting examples are dibenzoyl peroxide, dicumene peroxide, cumene hydroperoxide, diisopropyl peroxydicarbonate, bis(4-t-butylcyclohexyl) peroxydicarbonate, dipotassium persulfate, ammonium peroxodisulfate, 2,2'-azobis(2-methylpropionitrile) (AIBN), 2,2-azobis-(isobutyroamidine) hydrochloride, benzpinacol, dibenzyl derivatives, methylethylene ketone peroxide, 1,1-azobiscyclohexanecarbonitrile, methyl ethyl ketone peroxide, acetylacetone peroxide, dilauryl peroxide, didecanoyl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, tert-butyl peroxyisobutyrate, tert-butyl peroxyacetate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate and also the free-radical formers obtainable from DuPont under the name ®Vazo, for example ®Vazo V50 and ®Vazo WS.

Furthermore, it is also possible to use free-radical formers which form free radicals on irradiation. Preferred compounds include, inter alia, α,α-diethoxyacetophenone (DEAP, Upjon Corp), n-butylbenzoin ether (®Trigonal-14, AKZO) and 2,2-dimethoxy-2-phenylacetophenone (®Igacure 651) and 1-benzoylcyclohexanol (®Igacure 184), bis(2,4,6-trimethylbenzoyl)phenylphosphine oxide (®Irgacure 819) and 1-[4-(2-hydroxyethoxy)phenyl]-2-hydroxy-2-phenylpropan-1-one (®Irgacure 2959), each of which are commercially available from Ciba Geigy Corp.

It is usual to add from 0.0001 to 5% by weight, in particular from 0.01 to 3% by weight, (based on the weight of the monomers capable of free-radical polymerization; monomers containing phosphonic acid and/or sulfonic acid groups or the crosslinking monomers) of free-radical formers. The amount of free-radical formers can be varied depending on the desired degree of polymerization.

The polymerization can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV).

The polymerization can also be effected by action of UV light having a wavelength of less than 400 nm. This polymerization method is known per se and is described, for example, in Hans Joerg Elias, Makromolekulare Chemie, 5th edition, volume 1, pp. 492-511; D. R. Arnold, N. C. Baird, J. R. Bolton, J. C. D. Brand, P. W. M. Jacobs, P. de Mayo, W. R. Ware, Photochemistry—An Introduction, Academic Press, New York and M. K. Mishra, Radical Photopolymerization of Vinyl Monomers, J. Macromol. Sci.-Revs. Macromol. Chem. Phys. C22 (1982-1983) 409.

The polymerization can also be achieved by action of β-rays, γ-rays and/or electron beams. In a particular embodiment of the present invention, a membrane is irradiated with a radiation dose in the range from 1 to 300 kGy, preferably from 3 to 200 kGy and very particularly preferably from 20 to 100 kGy.

The polymerization of the monomers containing phosphonic acid and/or sulfonic acid groups or the crosslinking monomers is preferably carried out at temperatures above room temperature (20° C.) and less than 200° C., in particular at temperatures in the range from 40° C. to 150° C., particularly preferably from 50° C. to 120° C. The polymerization is preferably carried out under atmospheric pressure, but can also be carried out under superatmospheric pressure. The polymerization leads to a strengthening of the sheet-like structure, and this strengthening can be monitored by microhardness measurement. The increase in hardness resulting from the polymerization is preferably at least 20%, based on the hardness of the sheet-like structure obtained in step B).

According to a particular aspect of the present invention, the molar ratio of the molar sum of phosphoric acid, polyphosphoric acid and the hydrolysis products of polyphosphoric acid to the number of moles of phosphonic acid groups and/or sulfonic acid groups in the polymers obtainable by polymerization of monomers containing phosphonic acid groups and/or monomers containing sulfonic acid groups is preferably greater than or equal to 1:2, in particular greater than or equal to 1:1 and particularly preferably greater than or equal to 2:1.

The molar ratio of the molar sum of phosphoric acid, polyphosphoric acid and the hydrolysis products of polyphosphoric acid to the number of moles of phosphonic acid groups and/or sulfonic acid groups in the polymers obtainable from a polymerization of monomers containing phosphonic acid groups and/or monomers containing sulfonic acid groups is preferably in the range from 1000:1 to 3:1, in particular from 100:1 to 5:1 and particularly preferably from 50:1 to 10:1.

The molar ratio can be determined by customary methods. It is possible to use, in particular, spectroscopic methods, for example NMR spectroscopy, for this purpose. It needs to be remembered that the phosphonic acid groups are in the formal oxidation state 3 and the phosphorus in phosphoric acid, polyphosphoric acid and hydrolysis products thereof is in the oxidation state 5.

Depending on the desired degree of polymerization, the sheet-like structure obtained after the polymerization is a self-supporting membrane. The degree of polymerization is preferably at least 2, in particular at least 5, particularly preferably at least 30, repeating units, in particular at least 50 repeating units, very particularly preferably at least 100 repeating units. This degree of polymerization is given by the number average molecular weight $M_n$ which can be determined by GPC methods. Owing to the problems encountered in isolating the polymers containing phosphonic acid groups present in the membrane without degradation, this value is determined on a sample obtained by polymerization of monomers containing phosphonic acid groups without solvent and without addition of polymer. Here, the proportion by weight of monomers containing phosphonic acid groups and of free-radical initiators is kept constant in comparison to the ratios after detachment of the membrane. The conversion achieved in a comparative polymerization is preferably greater than or equal to 20%, in particular greater than or equal to 40% and particularly preferably greater than or equal to 75%, based on the monomers containing phosphonic acid groups which are used.

The hydrolysis liquid comprises water, with the concentration of water generally not being particularly critical. According to a particular aspect of the present invention, the hydrolysis liquid contains from 5 to 80% by weight, preferably form 8 to 70% by weight and particularly preferably from 10 to 50% by weight, of water. The amount of water which is formally present in the oxo acids is not taken into account in the water content of the hydrolysis liquid.

Among the abovementioned acids, phosphoric acid and/or sulfuric acid are particularly preferred, with these acids containing, in particular, from 5 to 70% by weight, preferably from 10 to 60% by weight and particularly preferably from 15 to 50% by weight, of water.

The partial hydrolysis of polyphosphoric acid in step D) leads to a strengthening of the membrane and to a decrease in the layer thickness and formation of a membrane. The strengthened membrane generally has a thickness in the range from 15 to 3000 μm, preferably from 20 to 2000 μm, in particular from 20 to 1000 μm, with the membrane being self-supporting.

The upper temperature limit for the treatment according to step D) is generally 150° C. In the case of an extremely short contact time, the hydrolysis liquid can also be hotter than 150° C. The duration of the treatment plays a critical role in determining the upper temperature limit. According to a particular aspect of the present invention, the membrane is cooled to room temperature in the hydrolysis liquid.

The treatment time can be within a wide range, with the time being dependent, in particular, on the water concentration of the hydrolysis liquid. The treatment time is also dependent on the thickness of the membrane.

In general, the treatment time is in the range from 10 seconds to 20 hours, in particular from 1 minute to 10 hours.

The membrane obtained in step D) can be self-supporting, i.e. it can be detached from the support without damage and subsequently be, if appropriate, processed further immediately or be stored.

The concentration of phosphoric acid and thus the conductivity of the polymer membrane of the invention can be set via the degree of hydrolysis, i.e. the time, temperature and hydrolysis liquid. According to the invention, the concentration of phosphoric acid is reported as mol of acid per mol of repeating units in the polymer. For the purposes of the present invention, a concentration (mole of phosphoric acid per repeating unit of the formula (III), i.e. polybenzimidazole) in the range from 10 to 100, in particular from 12 to 95, is preferred. Such high degrees of doping (concentrations) can be achieved only with great difficulty, if at all, by doping of polyazoles with commercially available ortho-phosphoric acid.

After the treatment in step D), the membrane can be additionally crosslinked by action of heat in the presence of oxygen. This hardening of the membrane produces an additional improvement in the properties of the membrane. For this purpose, the membrane can be heated to a temperature of at least 150° C., preferably at least 200° C. and particularly preferably at least 250° C. The oxygen concentration in this process step is usually in the range from 5 to 50% by volume, preferably from 10 to D 40% by volume, without this constituting a restriction.

Crosslinking can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is in this case in the range from 5 to 200 kGy.

Depending on the desired degree of crosslinking, the duration of the crosslinking reaction can be within a wide range. In general, this reaction time is in the range from 1 second to 10 hours, preferably from 1 minute to 1 hour, without this constituting a restriction.

The polymer membrane of the invention has improved materials properties compared to the previously known doped polymer membranes. In particular, they have, in contrast to known and doped polymer membranes, a better performance. This is due, in particular, to an improved proton conductivity. At temperatures of 120° C., this is at least 0.1 S/cm, preferably at least 0.11 S/cm, in particular at least 0.12 S/cm.

The specific conductivity is measured by means of impedance spectroscopy in a four-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated by means of a Pt-100 resistance thermometer positioned in the immediate vicinity of the specimen. After the temperature has been reached, the specimen is maintained at this temperature for 10 minutes before commencement of the measurement.

In a particular embodiment of the present invention, the membranes have a high mechanical stability. This parameter is given by the hardness of the membrane which is determined by means of microhardness measurement in accordance with DIN 50539. For this purpose, the membrane is gradually loaded with a Vickers diamond to a force of 3 mN over a period of 20 s and the indentation depth is determined. According to this, the hardness at room temperature is at least 5 mN/mm$^2$, preferably at least 50 mN/mm$^2$ and very particularly preferably at least 200 mN/mm$^2$, without a restriction being implied thereby. The force is subsequently kept constant at 3 mN for 5 s and the creep is calculated from the indentation depth. In the case of preferred membranes, the creep $C_{HU}$ 0.003/20/5 under these conditions is less than 30%, preferably less than 15% and very particularly preferably less than 5%. The modulus YHU determined by means of microhardness measurement is at least 0.1 MPa, in particular at least 2 MPa and very particularly preferably at least 5 MPa, without this constituting a restriction.

Compared to known polyazole membranes obtained as described in the patent applications DE 10117686.4 and DE 10117687.2, the membranes obtained by the process of the invention display particularly good mechanical properties. Thus, the fracture toughness at a high phosphoric acid content is surprisingly high.

Novel polymer electrolyte membranes having a phosphoric acid concentration of at least 85% by weight at a fracture toughness of at least 30 kJ/m$^2$, in particular 50 kJ/m$^2$ and particularly preferably 100 kJ/m$^2$, are thus made available.

Furthermore, preferred polymer electrolyte membranes display a high elongation at break of at least 60%, in particular at least 80% and particularly preferably at least 100%, at a phosphoric acid concentration of at least 85% by weight.

Novel polymer electrolyte membranes having particularly good performance and having a fracture toughness of at least 10 kJ/m$^2$, in particular 20 kJ/m$^2$ and particularly preferably 30 kJ/m$^2$, at a phosphoric acid concentration of at least 95% by weight are obtained according to the invention.

The measurement of the elongation at break/stress (fracture toughness) can be carried out on strip-shaped specimens having a width of 15 mm and a length of 120 mm using a Zwick Z010 tester. The tensile test can be carried out at a temperature of 25° C. using an elongation rate of 50 mm/min.

Possible fields of use of the polymer membranes of the invention include, inter alia, use in fuel cells, in electrolysis, in capacitors and in battery systems.

The present invention also provides a membrane-electrode unit which comprises at least one polymer membrane according to the invention. The membrane-electrode unit displays a high performance even at a low content of catalytically active substances, such as platinum, ruthenium or palladium. Gas diffusion layers provided with a catalytically active layer can be used for this purpose.

The gas diffusion layer generally displays electron conductivity. Sheet-like, electrically conductive and acid-resistant structures are usually used for this purpose. These include, for example, carbon fiber papers, graphitized carbon fiber papers, woven carbon fiber fabrics, graphitized woven carbon fiber fabrics and/or sheet-like structures which have been made conductive by addition of carbon black.

The catalytically active layer comprises a catalytically active substance. Such substances include, inter alia, noble metals, in particular platinum, palladium, rhodium, iridium and/or ruthenium. These substances can also be used in the form of alloys with one another. Furthermore, these substances can also be used in alloys with base metals such as Cr, Zr, Ni, Co and/or Ti. In addition, the oxides of the abovementioned noble metals and/or base metals can also be used.

According to a particular aspect of the present invention, the catalytically active compounds are used in the form of particles which preferably have a size in the range from 1 to 1000 nm, in particular from 10 to 200 nm and particularly preferably from 20 to 100 nm.

Furthermore, the catalytically active layer can further comprise customary additives. Such additives include, inter alia, fluoropolymers such as polytetrafluoroethylene (PTFE) and surface-active substances.

In a particular embodiment of the present invention, the weight ratio of fluoropolymer to catalyst material comprising at least one noble metal and, if appropriate, one or more support materials is greater than 0.1, preferably in the range from 0.2 to 0.6.

In a particular embodiment of the present invention, the catalyst layer has a thickness in the range from 1 to 1000 µm, in particular from 5 to 500 µm, preferably from 10 to 300 µm. This value represents a mean which can be determined by measuring the layer thickness in cross-sectional micrographs which can be obtained using a scanning electron microscope (SEM).

In a particular embodiment of the present invention, the noble metal content of the catalyst layer is from 0.1 to 10.0 mg/cm$^2$, preferably from 0.3 to 6.0 mg/cm$^2$ and particularly preferably from 0.3 to 3.0 mg/cm$^2$. These values can be determined by elemental analysis of a sheet-like sample.

For further information on membrane-electrode units, reference may be made to the specialist literature, in particular the patent applications WO 01/18894 A2, DE 195 09 748, DE 195 09 749, WO 00/26982, WO 92/15121 and DE 197 57 492. The disclosure of the abovementioned references in respect of the structure and the production of membrane-electrode units and also the electrodes, gas diffusion layers and catalysts to be selected is incorporated by reference into the present description.

In a further variant, a catalytically active layer can be applied to the membrane of the invention and be joined to a gas diffusion layer.

The present invention likewise provides a membrane-electrode unit comprising at least one polymer membrane according to the invention, if appropriate in combination with a further polymer membrane based on polyazoles or a polymer blend membrane.

In a further variant, a catalytically active layer can be applied to the membrane of the invention and be joined to a gas diffusion layer. For this purpose, a membrane is formed by means of the steps A) to D) and the catalyst is applied. These structures are also provided by the present invention.

Furthermore, the formation of the membrane by means of the steps A) to D) can also be carried out on a support or a support film on which the catalyst is present. After removal of the support or the support film, the catalyst is located on the membrane of the invention. These structures are also provided by the present invention.

The present invention likewise provides a membrane-electrode unit which comprises at least one coated electrode and/or at least one polymer membrane according to the invention in combination with a further polymer membrane based on polyazoles or a polymer blend membrane comprising at least one polymer based on polyazoles.

EXAMPLES 1-5

To produce the membrane, a poly(2,2'-(p-phenylene)-5,5'-bibenzimidazole)-co-poly((6,6'-bibenzimidazole-2,2'-diyl)-2,5-pyridine) solution in PPA was prepared as follows.

5.283 g of 2,5-pyridinedicarboxylic acid (125 mmol), 15.575 g of terephthalic acid (375 mmol), 26.785 g of TAB (0.5 mol) and 468 g of PPA were placed in a 500 ml three-necked flask. The reaction suspension was heated at 120° C. for 2 h, then at 150° C. for 4 h, subsequently at 190° C. for 6 h and then at 220° C. for 20 h. The reaction solution was then diluted at 220° C. with 600 g of 85% strength $H_3PO_4$, and subsequently stirred at 240° C. for 6 h.

A small part of the solution was precipitated with water. The precipitated resin was filtered off, washed three times with $H_2O$, neutralized with ammonium hydroxide, then washed with $H_2O$ and dried at 100° C. and 0.001 bar for 24 h. The inherent viscosity $\eta_{inh}$ was measured on a 0.2 g/dL polymer solution in 100 ml of 96% strength $H_2SO_4$. $\eta_{inh}$=3.2 dL/g at 30° C.

The highly viscous solution was applied at 200° C. to a polyethylene terephthalate film (PET film) by means of a preheated doctor blade to give a 500 μm thick membrane. A piece of membrane having a size of 20×30 cm was in each case placed in 1 l of $H_3PO_4$ having the following concentrations.

Example 1: 40% $H_3PO_4$
Example 2: 50% $H_3PO_4$
Example 3: 60% $H_3PO_4$
Example 4: 70% $H_3PO_4$
Example 5: 80% $H_3PO_4$ The membranes were then hydrolyzed in these hydrolysis baths at RT for 15 min, 30 min, 1 h, 2 h, 4 h, 6 h and 20 h. The membranes were then titrated with 0.1 N NaOH to determine the acid number per repeating unit. The results of the hydrolysis are shown in table 1 below.

TABLE 1

| Time [h] | Example 1 n(H3PO4)/n(PBI) | Example 2 n(H3PO4)/n(PBI) | Example 3 n(H3PO4)/n(PBI) | Example 4 n(H3PO4)/n(PBI) | Example 5 n(H3PO4)/n(PBI) |
|---|---|---|---|---|---|
| 0.25 | 29.7 | 41.3 | 60.8 | 92.8 | 93.6 |
| 0.5 | 25.5 | 30.9 | 46.9 | 76.7 | 83.8 |
| 1 | 18.4 | 25.6 | 37.7 | 53.5 | 70.4 |
| 2 | 15.7 | 21.7 | 30.7 | 40.3 | 58.0 |
| 4 | 17.2 | 19.6 | 31.2 | 43.8 | 54.0 |
| 6 | 16.8 | 22.3 | 29.6 | 40.4 | 49.1 |
| 20 | 11.5 | 16.3 | 23.6 | 34.8 | 45.6 |

EXAMPLES 6-8

The highly viscous solution was applied at 160° C. in a thickness of 500 μm to a PET film by means of a preheated doctor blade. A piece of membrane having a size of 20×30 cm was in each case hydrolyzed in 1 l of $H_3PO_4$ having the following concentrations for the following times.

Comparison 1: hydrolyzed by means of atmospheric moisture, 24 hours at room temperature
Example 6: in 50% $H_3PO_4$ for 20 min.
Example 7: in 60% $H_3PO_4$ for 1 h
Example 8: in 70% $H_3PO_4$ for 2 h The membranes were titrated with 0.1 N NaOH to determine the acid number per repeating unit. The titration results are summarized in table 2 below.

TABLE 2

| Sample | n(H$_3$PO$_4$)/n(PBI) |
|---|---|
| Comparison 1 | 47 |
| Example 6 | 51 |
| Example 7 | 46 |
| Example 8 | 41 |

The materials properties were determined in a tensile test and compared with comparative example 1 (table 3). The measurement of the elongation at break/stress (fracture toughness) is carried out on strip-shaped specimens having a width of 15 mm and a length of 120 mm using a Zwick Z010 tester. The tensile test is carried out at a temperature of 25° C. and an elongation rate of 50 mm/min.

TABLE 3

| Sample | Modulus of elasticity [MPa] | Fracture toughness [kJ/m$^2$] | Elongation at break [%] | Breaking stress [N/mm$^2$] |
|---|---|---|---|---|
| Comparison 1 | 5.44 | 18.58 | 43.36 | 0.66 |
| Example 6 | 7.06 | 111.18 | 155.71 | 1.06 |
| Example 7 | 6.35 | 112.52 | 148.74 | 1.05 |
| Example 8 | 6.21 | 116.22 | 156.10 | 1.10 |

50 cm$^2$ MEAs (membrane electrode assemblies) were then produced from these membranes and the properties were measured using $H_2$/air. In table 4 below, the values (rest potential (OCV); mV at 0.2 A/cm$^2$; mV at 0.6 A/cm$^2$ at 160° C. and 0 bar) are compared with sample 0.

TABLE 4

| MEA with | OCV | mV at 0.2 A/cm² | mV at 0.6 A/cm² |
|---|---|---|---|
| Comparative example 1 | 898 | 638 | 531 |
| Example 1 | 945 | 640 | 523 |
| Example 2 | 943 | 636 | 515 |
| Example 3 | 921 | 646 | 534 |

The rest potential is related directly to the permeability of the membrane to the fuel. The higher this permeability, the lower the rest potential. A high rest potential therefore indicates a low hydrogen permeability (cf. Handbook of Fuel Cells Fundamentals, Technology and Application, Editors: W. Vielstich; A. Lamm, H. A. Gasteiger).

The invention claimed is:

1. A process for producing proton-conducting polymer membranes, which comprises the steps
    A) preparation of a mixture comprising
        polyphosphoric acid,
        at least one polyazole and/or one or more compounds suitable for forming polyazoles under the action of heat in step B), with these compounds comprising one or more aromatic and/or heteroaromatic tetramino compounds and one or more aromatic and/or heteroaromatic carboxylic acids or derivatives thereof which contain at least two acid groups per carboxylic acid monomer, and/or one or more aromatic and/or heteroaromatic diaminocarboxylic acids,
    B) heating of the mixture obtainable according to step A) to temperatures up to 400° C. under inert gas,
    C) application of a layer to a support using the mixture from step A) and/or B),
    D) treatment of the membrane formed in step C),
characterized in that the treatment of the membrane is carried out using a hydrolysis liquid comprising
    oxo acids of phosphorus and/or oxo acids of sulfur.

2. The process as claimed in claim 1, characterized in that the mixture prepared in step A) comprises compounds suitable for forming polyazoles under the action of heat in step B), with these compounds being obtainable by reaction of one or more aromatic and/or heteroaromatic tetramino compounds with one or more aromatic and/or heteroaromatic carboxylic acids or derivatives thereof which contain at least two acid groups per carboxylic acid monomer or of one or more aromatic and/or heteroaromatic diamino carboxylic acids in the melt at temperatures of up to 400° C.

3. The process as claimed in claim 1, characterized in that the compounds suitable for forming polyazoles comprise, as aromatic and/or heteroaromatic tetramino compounds, compounds selected from the group consisting of 3,3',4,4'-tetraminobiphenyl, 2,3,5,6-tetraminopyridine and/or 1,2,4,5-tetraminobenzene.

4. The process as claimed in claim 1, characterized in that the compounds suitable for forming polyazoles comprise, as aromatic and/or heteroaromatic carboxylic acids or derivatives thereof which contain at least two acid groups per carboxylic acid monomer, compounds selected from the group consisting of isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4 naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenye) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid, or C1-C20-alkyl esters or C5-C12-aryl esters thereof, or anhydrides thereof or acid chlorides thereof.

5. The process as claimed in claim 1, characterized in that the compounds suitable for forming polyazoles comprise aromatic tricarboxylic acids, C1-C20-alkyl esters or C5-$C_{12}$-aryl esters thereof or anhydrides thereof or acid halides thereof or tetracarboxylic acids, $C_1$-$C_{20}$-alkyl esters or C5-C12-aryl esters thereof or anhydrides thereof or acid halides thereof.

6. The process as claimed in claim 5, characterized in that the aromatic tricarboxylic acids comprise compounds selected from the group consisting of 1,3,5-benzenetricarboxylic acid (trimesic acid); 2,4,5-benzenetricarboxylic acid (trimellitic acid); (2-carboxyphenyl)iminodiacetic acid, 3,5,3'-biphenyltri-carboxylic acid; 3,5,4'-biphenyltricarboxylic acid, 2,4,6-pyridinetricarboxylic acid, benzene-1,2,4,5-tetracarboxylic acid; naphthalene-1,4,5,8-tetracarboxylic acid, 3,5,3',5'-biphenyltetracarboxylic acid,
    benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid and/or 1,4,5,8-naphthalenetetra-carboxylic acid.

7. The process as claimed in claim 5, characterized in that the content of tricarboxylic acids and/or tetracarboxylic acids is in the range from 0 to 30 mol %, preferably from 0.1 to 20 mol %, in particular from 0.5 to 10 mol %, based on dicarboxylic acid used.

8. The process as claimed in claim 1, wherein the compounds suitable for forming polyazoles comprise heteroaromatic dicarboxylic acids, tricarboxylic acids and/or tetracarboxylic acids containing at least one nitrogen, oxygen, sulfur or phosphorus atom in the aromatic.

9. The process as claimed in claim 8, characterized in that pyridine-2,5-di-carboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedi-carboxylic acid, 2,4,6-pyridinetricarboxylic acid, benzimidazole-5,6-dicarboxylic acid, and also C1-C20-alkyl esters or C5-C12-aryl esters thereof, or anhydrides thereof or acid chlorides thereof are used.

10. The process as claimed in claim 1, characterized in that the compounds suitable for forming polyazoles comprise diaminobenzoic acid and/or monohydrochloride and dihydrochloride derivatives thereof.

11. The process as claimed in claim 1 characterized in that at least one further polymer (polymer B) which is not a polyazole is added to the composition obtainable in step A) and/or step B), with the weight ratio of polyazole to polymer B being in the range from 0.1 to 50.

12. The process as claimed in claim 1, characterized in that the heating according to step B) is carried out after formation of a sheet-like structure in step C).

13. The process as claimed in claim 1, characterized in that the treatment according to step D) is carried out at temperatures in the range from 0° C. to 150° C.

14. The process as claimed in claim 1, characterized in that the hydrolysis liquid comprises water in a concentration of from 5 to 80% by weight.

15. The process as claimed in claim 1, characterized in that phosphoric acid containing from 10 to 60% by weight of water is used as hydrolysis liquid.

16. The process as claimed in claim 1 characterized in that the hydrolysis liquid comprises phosphinic acid, phosphonic acid, phosphoric acid, hypodiphosphoric acid, hypodiphosphoric acid, oligophosphoric acids, sulfurous acid, disulfurous acid and/or sulfuric acid.

17. The process as claimed in claim 1, characterized in that the hydrolysis liquid comprises monomers which contain phosphonic acid and/or sulfonic acid groups and are capable of free-radical polymerization.

18. The process as claimed in claim 1, characterized in that the hydrolysis liquid comprises crosslinking monomers capable of free-radical polymerization.

19. The process as claimed in claim 1, characterized in that crosslinking monomers capable of free-radical polymerization are applied to the membrane after the hydrolysis.

20. The process as claimed in claim 17, characterized in that the monomers capable of free-radical polymerization are polymerized after the hydrolysis.

* * * * *